United States Patent [19]

John et al.

[11] Patent Number: 5,180,227
[45] Date of Patent: Jan. 19, 1993

[54] OPTICAL TEMPERATURE SENSORS

[75] Inventors: Laurence N. John; Neil A. Corner, both of London, England

[73] Assignee: Smiths Industries Public Limited Company, London, England

[21] Appl. No.: 756,551

[22] Filed: Sep. 9, 1991

[30] Foreign Application Priority Data

Sep. 15, 1990 [GB] United Kingdom ............... 9020219

[51] Int. Cl.⁵ .................. G01K 13/02; G01K 1/16; G01J 5/08
[52] U.S. Cl. .................. 374/131; 374/132; 374/135
[58] Field of Search ............ 374/125, 130, 131, 132, 374/135, 144, 159, 161, 162, 139, 140; 356/43, 44

[56] References Cited

U.S. PATENT DOCUMENTS

| | | | |
|---|---|---|---|
| 2,798,893 | 7/1957 | Winkler | 374/135 X |
| 4,444,516 | 4/1984 | Dostoomian et al. | 374/131 |
| 4,452,538 | 6/1984 | Reger et al. | 374/124 |
| 4,737,038 | 4/1988 | Dostoomian | 374/139 |

FOREIGN PATENT DOCUMENTS

| | | |
|---|---|---|
| 0064609 | 11/1982 | European Pat. Off. . |
| 0275059 | 7/1988 | European Pat. Off. . |
| 393961 | 6/1977 | U.S.S.R. .................. 356/43 |

Primary Examiner—William A. Cuchlinski, Jr.
Assistant Examiner—W. Morris Worth
Attorney, Agent, or Firm—Pollock, VandeSande and Priddy

[57] ABSTRACT

An optical temperature sensor has an outer probe with a sapphire element at its forward end within a stagnation chamber through which hot gas flows and heats a thermally-emissive coating on the element. A lens focusses radiation emitted by the coating onto one end of a fibre-optic cable that extends within the rear of the probe. A gas passage along the probe enables cooling gas to flow from an inlet at the rear end, around the fibre optic cable, lens and through an outlet rearwardly of a transparent thermal barrier which protects the sapphire element from the cooling gas.

9 Claims, 1 Drawing Sheet

OPTICAL TEMPERATURE SENSORS

BACKGROUND OF THE INVENTION

This invention relates to optical temperature sensors.

Optical temperature sensors are used to provide an indication of the temperature of, for example, gas-turbine engines, where an optical output is required rather than an electrical output, or where an electrical sensor will not withstand the environment being measured.

At high temperatures, it is usual to use sapphire or similar high-temperature resistant, infra-red transparent materials to form a radiation guide between the sensing tip of the apparatus and a cooler region, where the sapphire guide is connected to a fibre-optic cable that is resistant only to lower temperatures. Radiation emitted by an emissive surface close to the tip of the sapphire guide falls on the guide and is supplied via the fibre-optic cable to one or more detectors which provide an electrical output to a processor. The processor provides an output representative of temperature to a display, a control or other utilization means.

Such sensors may be subject to considerable variations in temperature along the length of the sapphire guide, such as from 1300 degrees Centigrade at the sensing tip to 200 degrees Centigrade where the sapphire guide joins with the fibre-optic cable. The tip of the sensor may, furthermore, in some applications, be exposed to a lower temperature than some other part of the sensor, to the rear of the tip. This causes problems with conventional sensors because the sapphire itself has a thermal emissivity and will emit radiation into the guide with a spectrum dependent on its temperature. This can cause temperature measurement errors which are a particular problem where the sensor is required to measure accurately the temperature of the region at the tip of the sensor.

BRIEF SUMMARY OF THE INVENTION

It is an object of the present invention to provide a sensor which can be used to alleviate this problem.

According to one aspect of the present invention there is provided an optical temperature sensor including an outer elongate probe having a gas passage along a major part of its length, means for supplying cooling gas to the passage, an optically-transparent element exposed close to the forward tip of the probe to the temperature to be measured but protected from the cooling gas, an optical radiation guide extending within the probe exposed to the cooling gas and spaced from the element by a gas gap, and means focussing radiation from the transparent element onto the radiation guide.

The sensor may include an optically-transparent thermal barrier within the probe which is exposed to the cooling gas and protects the optically-transparent element from the cooling gas. All optically-transparent components between the radiation guide and the thermal barrier may be exposed to the cooling gas. The thermal barrier may be of sapphire and may have an opaque coating with a central aperture that prevents unwanted radiation reaching the radiation guide. The optically-transparent element may have a surface with an opaque coating that is thermally emissive. The coating may be a metal oxide. The optically-transparent element is preferably located in a chamber at the forward tip of the probe, the chamber opening externally of the probe through an inlet and outlet so that gas can flow through the chamber over the element such that the radiation focussed on the radiation guide is indicative of the temperature of the gas flowing through the chamber. The optically-transparent element may be of rod shape, there being an annular space between the forward end of the element and the probe. The rear end of the element may substantially prevent flow of gas along the probe past the rear end of the element. The focussing means may include a lens that focusses an image of a part of the transparent element onto an end of the radiation guide, the image being smaller than the end of the radiation guide. The image formed by the lens is preferably smaller than the part of the transparent element. The sensor may have slots between the lens and the probe for the passage of cooling gas between the lens and probe. The optically-transparent element may be of sapphire. The sensor may include an inlet for cooling gas towards the rear end of the sensor and an outlet for the cooling gas located forwardly of the inlet and rearwardly of the transparent element.

A radiation sensor for use on a gas-turbine engine in accordance with the present invention, will now be described, by way of example, with reference to the accompanying drawings.

DESCRIPTION OF THE PREFERRED EMBODIMENTS

Figure 1:
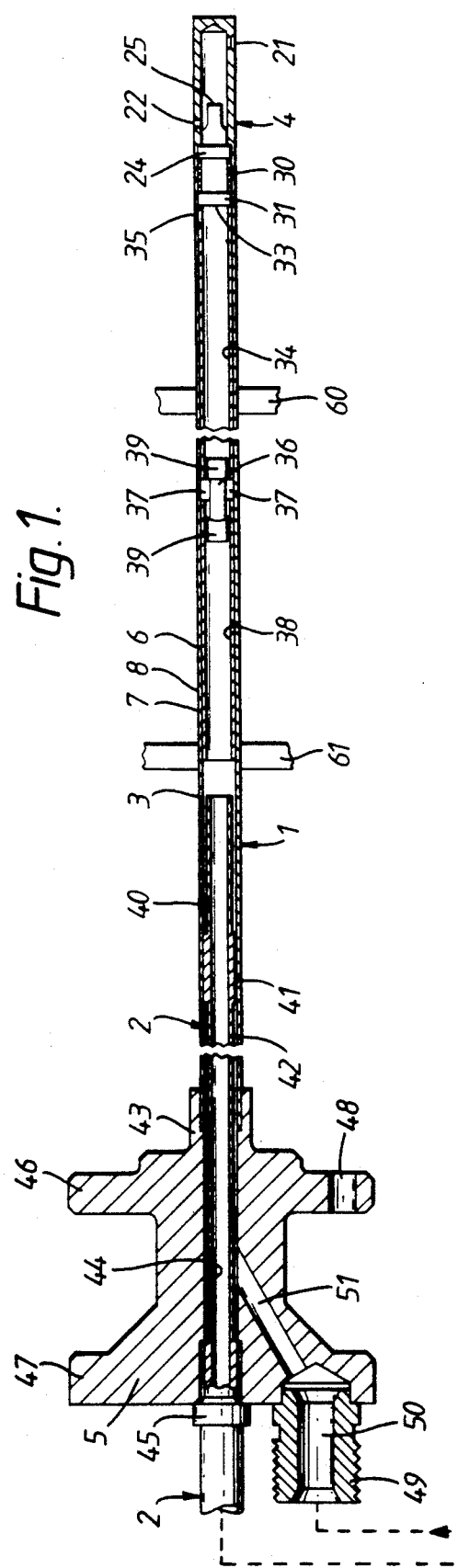
FIG. 1 is a sectional side elevation of the sensor.
Figure 2:
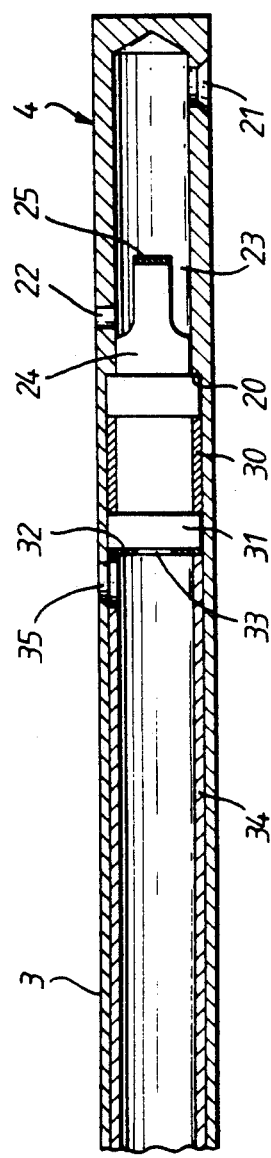
FIG. 2 is a sectional side elevation of the operative tip of the sensor to a larger scale.

The sensor includes a substantially rigid probe 1 and a flexible fibre-optic cable 2. The probe has an outer cylindrical sheath 3 about 450 mm long which extends from its forward, operative or sensing tip 4 to a rear mount 5 by which cooling gas is supplied to the probe and by which an optical output is supplied on the fibre-optic cable 2.

The outer sheath 3 is of circular section with an external diameter of 6 mm. The forward end 6 of the sheath is made of a high temperature, oxidation-resistant alloy such as Incoloy MA956 whereas the rear end 7, which is brazed at 8 to the forward end, is made of a steel such as BS T72. The forward end of the sheath 3 is closed except for a small gas inlet hole 21 formed through the lower side of the sheath close the tip 4, and a smaller outlet hole 22 formed on the opposite side of the sheath but displaced from the inlet hole by about 10 mm rearwardly. The inlet and outlet holes 21 and 22 communicate with a stagnation chamber 23 within the tip of the probe. Located within the chamber 23 is a sensing element 24 formed by a short cylindrical rod of sapphire, or a similar optically-transparent element, with a coating 25 on its forward end which is of an opaque, thermally-emissive, oxidation-resistant material such as a metal oxide. The element 24 is 7 mm long and of circular section having a reduced diameter at its forward end of 2 mm so that there is an annular space around the element 24, between the sheath 3, in the region of the outlet hole 22. The rear end of the element 24 has the same diameter as the inside of the sheath 3 and is stepped to locate on a shoulder 20 formed around the inside of the sheath just rearwardly of the outlet hole 22. The location of the rear end of the element 24 is such that there is no substantial gas flow past the rear of the element. The element 24 is mounted concentrically within the chamber 23 so that gas can flow over its coated end 25 and around its curved side between the inlet 21 and outlet 22. The rear end of the sapphire sensing element 24 is located by engagement with the forward end of a sleeve-shape forward spacer 30 made of Incoloy MA956 alloy. The forward spacer 30 is about 5 mm long and has an external diameter equal to the internal diameter of the sheath 3 so that it is a firm, secure fit within the sheath. The rear end of the spacer 30 is abutted by a disc-shape thermal barrier 31. The thermal barrier is provided by a circular sapphire plate which has an opaque coating 32 on one surface apart from a circular central aperture 33 of 2 mm diameter. The diameter of the thermal barrier 31 is the same as the internal diameter of the sheath 3 and it is located in position by means of an intermediate Incoloy spacer 34 of tubular shape which is a close fit within the sheath, in the same manner as the forward spacer 30. Just to the rear of the thermal barrier 31, a small cooling gas outlet 35, 2.4 mm in diameter, is formed through the sheath 3 and spacer 34. This outlet 35 is positioned on the upper side of the sensor, aligned with the other outlet 22.

The intermediate spacer 34 extends rearwardly along the probe by a distance of about 105 mm and locates, on its rear end, a sapphire converging lens 36. The lens is of circular shape but has several short, radially-extending slots 37 milled into its edge to provide paths for flow of cooling gas. The lens 36 is contacted on its rear side, about its edge, by the forward end of the rear spacer 38 which is similar to the other spacer 30 and 34 and is 38 mm long. The forward end of the rear spacer 38 and the rear end of the intermediate spacer 34 are cut away to form grooves or castellations 39 to improve gas flow around the lens. The rear spacer 38 is located securely in the sheath 3 by the brazed joint 8 between the forward end 6 and the rear end 7. The focal length of the lens 36, and the lengths of the spacers 30, 34 and 38, are selected such that the lens 36 forms an image of the forward, coated end 25 of the sensing element 24 in a plane through the forward end of the fibre-optic cable 2 which is spaced from the rear spacer by about 5 mm.

The fibre-optic cable 2 has a rigid metal ferrule 40 at its forward end which is retained in the sheath 1 by brazing, the ferrule being milled with flats 41 or similar surface formations along its length to form gas passages that enable cooling gas to flow between the cable 2 and the sheath 3. Rearwardly of the ferrule 40, the external diameter of the cable 2 is less than the internal diameter of the sheath 1 so that there is an annular gas passage 42 around the cable. The portion of the fibre-optic cable 2 within the probe 1 has a rigid fibre bundle approximately 300 mm long, the remainder of the cable being flexible and may be between 5 m and 20 m in length. The rear end of the cable 2 extends to a detector unit 100 which provides electrical outputs to a processor 101 which in turn provides an output representative of temperature to a display or other utilization means 102.

At its rear end, the sheath 3 is brazed into a collar 43 at the forward end of the mount 5. The mount 5 in machined from steel and has an axial bore 44 along its length through which the cable 2 extends. The rear end of the axial bore 44 is sealed with the cable 2 by a termination 45 on the cable that is bonded to the mount 5 with an epoxy, so as to prevent passage of gas out of the rear end of the bore. Externally, the mount 5 has two radial flanges 46 and 47. The forward flange 46 has several apertures 48 for receiving bolts (not shown) by which the probe is secured in position on the engine. The rear flange 47 supports an externally-threaded pipe fitting 49 which has a bore 50 through it which communicates with a lateral bore 51 in the mount 5. The lateral bore 51 communicates with the axial bore 44 through the mount.

When installed in an engine, the probe 1 is supported by the mount 5 at its rear end and by two supports 60 and 61 spaced along the probe within the engine. The tip 4 of the probe is located in an upward flow of gas at up to about 1300 degrees Centigrade. The forward 55 mm of the sensor is exposed to this temperature on its outside. The temperature on the exterior of the intermediate portion of the sensor, including the part within which the lens 36 is located, is between about 800 to 600 degrees Centigrade. The external temperature in the region of the forward end of the cable 2 is about 200 degrees Centigrade.

Cooling air, or other gas, is supplied from a compressor 63 to the fitting 49 where it flows along the lateral bore 51 and forwardly along the axial bore 44 into the gas passage 42. The cooling air then flows into the rear spacer 38 and into the intermediate spacer 34 through the slots 37 around the lens 36. At the forward end of the intermediate spacer 34, passage of gas along the probe 1 is blocked by the thermal barrier 31, so the cooling air flows out of the probe through the outlet 35. The cooling air, therefore, cools the cable 2, lens 36 and thermal barrier 31 together with the spacers 38 and 34, and that part of the sheath 3 rearwardly of the barrier 31. The pressure of cooling air is arranged to be greater than the engine gas pressure in the region of the outlet 35, to ensure that the air can flow out of the probe.

Hot gas entering the inlet 21 is slowed down as it enters the stagnation chamber 23 so that it is brought almost to rest as it flows over the element 24 before exiting through the outlet 22. In this way, the element 24 is subject to the Total Temperature of the gas flow. The element 24 and its coating 25 will, therefore, be raised to the gas temperature and the coating will emit radiation with a spectrum dependent on this temperature.

The bulk of the sapphire element 24 ensures that hot gas cannot flow across the rear face of the coating 25, so that the radiating, rear face of the coating is protected from damage and contamination. Also, this prevents particles within the hot gas coming into the line-of-sight between the cable 2 and the coating 25. Because the sensing element 24 is protected from the cooling gas by the gas gap within the forward spacer 30, the sensing element is maintained at the desired temperature, namely that of the hot gas flow.

The size of the aperture 33 in the thermal barrier 31 is chosen so that only radiation from the coating 25 is imaged on the end of the cable 2. Unwanted radiation, such as from the sheath 3, which might pass through the uncoated surface regions of the sensing element 24, is prevented from reaching the cable 2 by the coating 32 on the thermal barrier. The length of the gap between the thermal barrier 31 and the sensing element 24 is kept as short as possible. Where the sensor is used in engine applications, it will be subject to vibration which will cause some flexing of the probe. Locating the aperture 33 as close as possible to the radiation-emitting surface 25, minimizes relative movement between the aperture and this surface and hence minimizes variation in the level of radiation incident on the fibre-optic cable 2 caused by bending of the probe. The power of the lens and its location are such that the image formed on the end of the fibre-optic cable 2 is reduced by a factor of three. Since the diameter of the coating end of the sensing element 24 is 2 mm, the image of this will occupy a circular region of diameter 0.67 mm centrally of the aperture of the cable. Surrounding this will be an image of a 6 mm diameter region of the object plane which will include the thermal barrier 31. Because this is maintained cool, it will not emit any substantial amount of radiation and will not, therefore, affect the signal on the cable. The image of the coating 25 on the sensing element 24 only occupies a central region of the cable aperture which is 2 mm wide, so that the image can be displaced by 0.67 mm in any direction while still being wholly within the aperture. This displacement is equivalent to a displacement of the sensing element by 2 mm, giving the sensor a 2 mm bending tolerance.

The construction of the sensor minimizes the amount of sapphire or other radiation-transmitting material between the sensor tip and the fibre-optic cable. This reduces to a minimum any effect caused by the thermal emissivity of the sapphire itself. Although the sapphire element 24 at the tip will itself emit some radiation, this is at the same temperature as the coating 25 and will, therefore, have the same spectral characteristics, so that it does not have an adverse effect on the temperature measurement. The bulk of the thermal barrier 31 and the lens 36 is relatively low so the amount of radiation emitted by these elements will also be low. The contribution from the thermal barrier 31 and the lens 36 is further reduced because they are maintained cool.

The design of the sensor allows the sensing tip to be located in a region that is cooler than a region to the rear of the tip without the hotter region affecting the reading provided by the sensor. This is because of the low bulk of material within the probe behind the sensing tip and because any material is kept cool by the cooling gas.

In a typical engine, several sensors of different lengths can be used so that the temperatures of different points across the hot gas flow are measured.

It will be appreciated that various different materials could be used, for example, the sheath might be of ceramic for high temperature applications.

What we claim is:

1. An optical temperature sensor comprising an outer elongate probe having an optically-transparent element within and exposed close to a forward tip of the probe to a temperature to be measured, an optical radiation guide extending within the probe means for focussing radiation from said optically-transparent element onto said optical radiation guide, a gas passage along the length of said probe, means for supplying cooling gas to said gas passage, and an optically-transparent thermal barrier between a forward end of said optical radiation guide and said optically-transparent element so arranged that said radiation guide and said optically-transparent barrier are exposed to the cooling gas and the optically-transparent element is protected by said optically-transparent barrier from the cooling gas.

2. A sensor according to claim 1 wherein the thermal barrier has an opaque coating covering a surface of said thermal barrier apart from a central region of said barrier.

3. A sensor according to claim 1, wherein the optically-transparent element has a forward surface with an opaque coating, said coating being thermally emissive, radiation emitted by said coating passing along said optically-transparent element and through a rear surface of said optically-transparent element.

4. A sensor according to claim 1, wherein the probe has at a forward end a chamber that opens externally of the probe through an inlet and an outlet so that gas can flow through the chamber, the optically-transparent element being so located in the chamber that gas flowing through the chamber flows over the optically-transparent element and the radiation focussed on the radiation guide is indicative of the temperature of the gas flowing through the chamber.

5. A sensor according to claim 1, wherein the optically-transparent element is of rod-shape and has a forward end and a rear end, wherein the optically-transparent element is mounted at its said rear end in the probe, and wherein there is an annular space between the forward end of the optically-transparent element and the probe.

6. A sensor according to claim 1, wherein said means for focussing is a lens that focusses an image of a part of said optically-transparent element onto an end of the radiation guide, said image being smaller than said end of the radiation guide.

7. A sensor according to claim 6, wherein the image formed by said lens is smaller than said part of the optically transparent element.

8. A sensor according to claim 6, wherein an edge of said lens has slots for the passage of cooling gas between the lens and probe.

9. A sensor according to any one of the preceding claims, wherein the sensor includes an inlet for cooling gas towards a rear end of the probe and an outlet for the cooling gas located forwardly of said inlet and rearwardly of the optically transparent element.

* * * * *